United States Patent
Nguyen et al.

(10) Patent No.: US 10,745,611 B2
(45) Date of Patent: Aug. 18, 2020

(54) USE OF NANOPARTICLES TO TREAT FRACTURE SURFACES

(71) Applicant: Halliburton Energy Services, Inc., Houston, TX (US)

(72) Inventors: Philip D. Nguyen, Houston, TX (US); James William Ogle, Spring, TX (US); Ronald Glen Dusterhoft, Katy, TX (US); Tatyana V. Khamatnurova, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/074,296

(22) PCT Filed: Jun. 29, 2016

(86) PCT No.: PCT/US2016/040000
§ 371 (c)(1),
(2) Date: Jul. 31, 2018

(87) PCT Pub. No.: WO2018/004560
PCT Pub. Date: Jan. 4, 2018

(65) Prior Publication Data
US 2019/0345375 A1     Nov. 14, 2019

(51) Int. Cl.
*C09K 8/66* (2006.01)
*C09K 8/80* (2006.01)
*E21B 43/267* (2006.01)

(52) U.S. Cl.
CPC ............ *C09K 8/665* (2013.01); *C09K 8/80* (2013.01); *C09K 8/805* (2013.01); *E21B 43/267* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 6,069,118 | A | 5/2000 | Hinkel et al. |
| 6,840,318 | B2 | 1/2005 | Lee et al. |
| 7,786,049 | B2 | 8/2010 | Temple et al. |
| 8,449,856 | B2 | 5/2013 | Yano et al. |
| 8,783,352 | B2 | 7/2014 | Chenevert et al. |
| 2007/0275068 | A1 | 11/2007 | Martens et al. |

(Continued)

FOREIGN PATENT DOCUMENTS

| | | |
|---|---|---|
| WO | 9834723 | 8/1998 |
| WO | 2012142240 A1 | 10/2012 |

(Continued)

OTHER PUBLICATIONS

Al-Bazali, T.M. et al., Measurement of the Sealing Capacity of Shale Caprocks, SPE 96100, Society of Petroleum Engineers, 2005.

(Continued)

*Primary Examiner* — Anuradha Ahuja
(74) *Attorney, Agent, or Firm* — McAfee & Taft

(57) ABSTRACT

A method of fracturing a subterranean formation is provided. A fracturing fluid is pumped into the formation to fracture the formation. A plurality of nanoparticles is mixed with the fracturing fluid and placed in the fracture. A plurality of conventional proppant particulates is also mixed with the fracturing fluid and placed in the fracture.

17 Claims, 5 Drawing Sheets

(56) References Cited

U.S. PATENT DOCUMENTS

| | | | |
|---|---|---|---|
| 2010/0167965 A1* | 7/2010 | Sebastian | C09K 8/80 507/230 |
| 2010/0255103 A1 | 10/2010 | Liong et al. | |
| 2011/0000672 A1 | 1/2011 | Huang | |
| 2011/0118155 A1* | 5/2011 | Pisklak | C04B 20/1074 507/274 |
| 2011/0144386 A1 | 6/2011 | Tour et al. | |
| 2012/0048548 A1* | 3/2012 | Crews | C09K 8/602 166/278 |
| 2012/0183620 A1 | 7/2012 | Cho et al. | |
| 2012/0227967 A1* | 9/2012 | Shaikh | C09K 8/805 166/280.1 |
| 2012/0264884 A1 | 10/2012 | Liu et al. | |
| 2013/0046274 A1 | 2/2013 | Zink et al. | |
| 2014/0008067 A1 | 1/2014 | Roddy et al. | |
| 2014/0014338 A1* | 1/2014 | Crews | E21B 43/26 166/280.1 |
| 2014/0034309 A1 | 2/2014 | Saini et al. | |
| 2014/0305649 A1* | 10/2014 | Tang | C09K 8/70 166/308.2 |
| 2015/0353816 A1* | 12/2015 | Thrash | C09K 8/80 166/308.2 |
| 2016/0032177 A1 | 2/2016 | Howe et al. | |
| 2016/0215205 A1* | 7/2016 | Nguyen | E21B 43/267 |
| 2016/0298025 A1* | 10/2016 | Thrash | C09K 8/80 |
| 2016/0319189 A1* | 11/2016 | Dusterhoft | E21B 43/04 |
| 2016/0355727 A1* | 12/2016 | Barati Ghahfarokhi | C09K 8/80 |
| 2016/0376495 A1* | 12/2016 | Nguyen | C09K 8/66 166/280.2 |
| 2017/0121596 A1* | 5/2017 | Canova | E21B 43/26 |
| 2017/0145301 A1 | 5/2017 | Roper et al. | |
| 2018/0010435 A1* | 1/2018 | Nguyen | E21B 43/267 |

FOREIGN PATENT DOCUMENTS

| | | | |
|---|---|---|---|
| WO | 2013116920 A1 | 8/2013 | |
| WO | 2015041690 A1 | 3/2015 | |
| WO | WO2015041690 * | 3/2015 | E21B 43/26 |
| WO | 2015065324 A1 | 5/2015 | |
| WO | 2016036343 A1 | 3/2016 | |

OTHER PUBLICATIONS

Sensoy, T. et al., Minimizing Water Invasion in Shale Using Nanoparticles, SPE 124429, Society of Petroleum Engineers, 2009.

Cai, Jihua et al., Decreasing Water Invasion into Atoka Shale Using Non-modified Silica Nanoparticles, SPE 146979, Society of Petroleum Engineers, 2011.

CA Examination Report mailed in corresponding Canadian Application No. 3,014,599 dated Jun. 3, 2019, pp. 1-7.

CA 2nd Examination Report mailed in corresponding Canadian Application No. 3,014,599 dated Dec. 19, 2019, pp. 1-6.

* cited by examiner

USE OF NANOPARTICLES TO TREAT FRACTURE SURFACES

BACKGROUND

In order to efficiently produce hydrocarbons from a subterranean formation, the formation must be sufficiently conductive in order to allow the hydrocarbons to flow from the formation to the wellbore. Various treatments for increasing the conductivity of a subterranean formation have been developed.

One technique for increasing the conductivity of a subterranean formation and thereby stimulating production of hydrocarbons from the formation is hydraulic fracturing. Hydraulic fracturing generally involves pumping one or more fracturing fluids into the formation at a sufficient hydraulic pressure to create or enhance one or more fractures in the formation. Typically, a pad fracturing fluid ("a pad fluid") that does not contain conventional proppant particulates is first injected into the formation to initially fracture the formation. Thereafter, a slurry of proppant particulates (a "proppant slurry") is injected into the formation. The proppant slurry places the proppant particulates in the fracture in order to prevent the fracture from fully closing once the hydraulic pressure created by the fluid is released and the fracturing operation is complete. The resulting propped fracture provides one or more conductive channels through which fluids in the formation can flow from the formation to the wellbore.

Fracturing tight or low permeability formations such as shale, sandstone and coal bed formations requires special considerations. For example, shale, sandstone and coal bed formations can each have a permeability as low as approximately one millidarcy (mD) or less. Hydraulically fracturing such formations typically forms a complex fracture network in a zone of the formation surrounding the wellbore that includes primary fractures and microfractures.

For example, microfractures can extend outwardly from the tip and edges of primary fractures in a branching tree-like manner. The microfractures can extend transversely to the trajectory of the primary fractures allowing them to reach and link natural fractures both in and adjacent to the trajectory of the primary fractures. The microfractures can exist and be formed in both near-wellbore and far-field regions of the zone. As a result, the microfractures can significantly increase contact areas with the formation matrix to give more depth and breadth to the fracture network resulting in increased production of hydrocarbons when the well is produced.

In the absence of proppant particulates, the microfractures tend to close back or seal when the hydraulic pressure placed on the formation dissipates after injection of the fracturing fluid into the well is ceased. Due to their size, conventional proppant particulates cannot be easily placed in microfractures to keep the microfractures open. Allowing the microfractures to close or seal can potentially cut off a significant portion of the fracture network and ultimately prevents the production of valuable hydrocarbons therefrom.

In order to address this issue, micro-proppant particulates having a size sufficient to allow the particulates to be placed in microfractures have been developed. For example, including micro-proppant particulates in the pad fracturing fluid places the micro-proppant particulates in the fissure openings to the microfractures once they are opened or created. By propping the microfractures open, the micro-proppant particulates help maintain fluid communication between the microfractures and the primary fractures and wellbore.

An additional issue that can arise when fracturing low permeability formations is removal of the fracturing fluid from the fracture network. Fluid loss to the formation can inhibit the flow of hydrocarbons through the formation during the production stage. Also, shale and clays therein can be very sensitive to water. Water imbibition by shale can cause the shale to swell and slough, and can cause clay minerals in the shale to migrate. Shale swelling and clay migration into the propped fractures can block passageways to the wellbore and cause a loss in the permeability of the formation. Also, microfractures can lose their integrity and cave in due to stresses created during the production stage.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
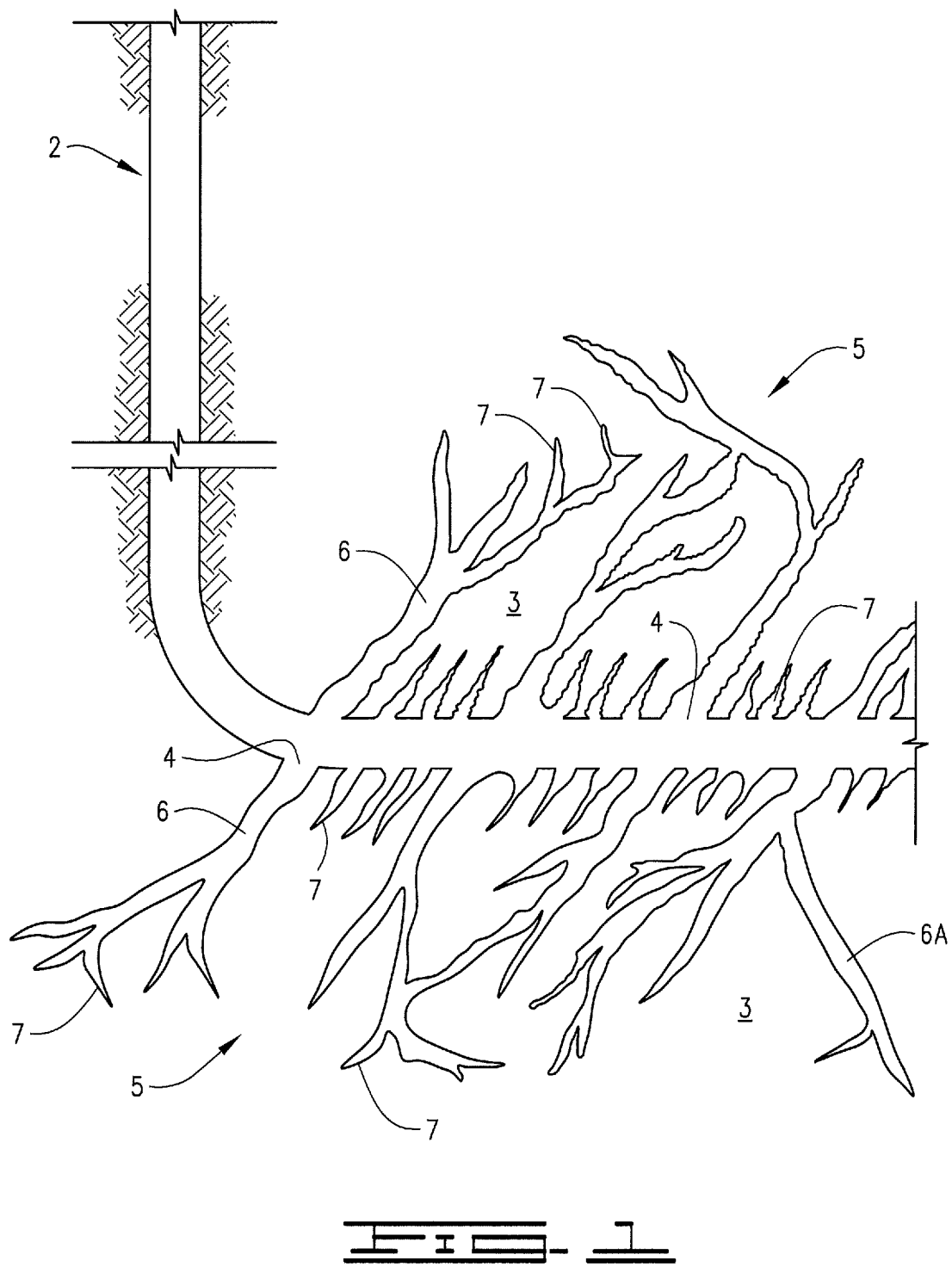
FIG. 1 illustrates a non-limiting example of a dendritic fracture network extending from a wellbore into a subterranean formation.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the disclosed subject matter. However, it will be understood by those of ordinary skill in the art that the subject matter described herein can be practiced without these specific details. In other instances, methods, procedures and components have not been described in detail so as not to obscure the related relevant feature being described. Also, the description is not to be considered as limiting the scope of the subject matter described herein. The drawings are not necessarily to scale and the proportions of certain parts may have been exaggerated to better illustrate details and features of the present disclosure.

In accordance with this disclosure, a method of fracturing a subterranean formation is provided. The method comprises the following steps:

providing a fracturing fluid, the fracturing fluid including a base carrier fluid;

pumping the fracturing fluid into the formation at a pressure above the fracture gradient of the formation to form a fracture in the formation;

mixing a plurality of nanoparticles with the fracturing fluid and placing nanoparticles in the fracture;

mixing a plurality of primary proppant particulates with the fracturing fluid and placing primary proppant particulates in the fracture; and ceasing pumping of the fracturing fluid into the formation.

In accordance with the disclosed method, when pumping of the fracturing fluid into the formation is ceased or the pressure at which the fracturing fluid is pumped into the formation is otherwise caused to fall below the fracture gradient of the formation, the fracture formed in the formation may tend to close. However, the primary proppant particulates and/or nanoparticles prevent the fracture from fully closing or otherwise provide conductive fluid pathways through the fracture. The resulting propped fracture provides one or more conductive channels through which fluids in the formation can flow through the formation toward the wellbore. As used herein and in the appended claims, unless stated otherwise, the term "fracture" includes and encompasses primary fractures and microfractures.

The disclosed method is particularly suitable for use in fracturing a low permeability formation. As used herein and in the appended claims, the term "low permeability formation" means a subterranean formation or a portion thereof having a permeability of less than or equal to about one millidarcy (mD). Examples of low permeability formations include shale formations, sandstone formations and coal bed formations. The term "shale formation" means a formation that consists of or includes shale. The term "sandstone formation" means a formation that consists of or includes sandstone. The term "coal bed formation" means a formation that consists of or includes one or more coal beds.

For example, at least a portion of the subterranean formation may have a permeability ranging from a lower limit of about 0.1 nanodarcy (nD) to an upper limit of about 1.0 mD, and any subset therebetween (for example, about 0.4 nD to about 0.6 nD). One method to determine the subterranean formation permeability includes The American Petroleum Institute Recommended Practice 40, "Recommended Practices for Core Analysis," Second Edition, February 1998.

As used herein and in the appended claims, the term "fracturing fluid" means a pad fracturing fluid, a proppant slurry or any other type of treatment fluid that is pumped into the subterranean formation at a pressure above the fracture gradient of the formation during a hydraulic formation fracturing operation. The term "pad fracturing fluid" means a fracturing fluid that does not include primary proppant particulates. A pad fracturing fluid is typically used to initiate the fracture or fracture network and is injected into the formation in multiple stages ("hereafter pad fluid stages"). The term "proppant slurry" means a fracturing fluid that does include primary proppant particulates. A proppant slurry is typically used after a fracture or fracture network is initiated in the formation and is injected into the formation in multiple stages ("hereafter proppant slurry stages").

As used herein and in the appended claims, the term "nanoparticle" means a particulate having a D50 particle size distribution of no greater than 500 nanometers. The term "primary proppant particulate" means a proppant particulate having a D50 particle size distribution of equal to or greater than 100 microns. The "D50 particle size distribution" of a particulate means the value of the particle diameter at 50% in the cumulative distribution. A "propped fracture" means a fracture (naturally-occurring or otherwise) in a subterranean formation that contains a plurality of nanoparticles, micro-proppant particulates or primary proppant particulates.

As discussed further below, the fracturing fluid in general and the base carrier fluid of the fracturing fluid provided by the above method can be aqueous-based or oil-based. In most applications, the fracturing fluid in general and the base carrier fluid of the fracturing fluid provided by the above method are aqueous-based. The fracturing fluid typically includes other components as well.

In carrying out the above method, the fracturing fluid is pumped through the wellbore and through one or more access conduits into the formation. As used herein and in the appended claims, the term "access conduit" refers to a passageway that provides fluid communication between the wellbore and the formation. Examples of access conduits include sliding sleeves, open holes, hydra-jetted holes and perforations. Access conduits can be formed in non-cased (open) areas and cased areas of the wellbore. The access conduits can extend through the casing wall (if present), cement used to hold the casing in place (if present) and the wellbore wall.

The fracturing fluid is pumped into the subterranean formation at a pressure above the fracture gradient of the formation to form a fracture therein in any manner known to those skilled in the art of fracturing subterranean formations. As used herein and in the appended claims, the "fracture gradient" of a formation means the minimum pressure required to create a new fracture or expand an existing fracture in some dimension in the formation. "Fracturing the formation" means forming a new fracture or expanding an existing fracture in some dimension in the formation.

For example, pumping the fracturing fluid into the formation at a pressure above the fracture gradient of the formation in accordance with the disclosed method can form one or more primary fractures in the formation. For example, pumping the fracturing fluid into the formation at a pressure above the fracture gradient of the formation in accordance with the disclosed method can also form a fracture network in the formation that includes at least one primary fracture and at least one microfracture. When a fracture network is formed, placing nanoparticles in the fracture in accordance with the disclosed method includes placing nanoparticles in the microfracture. Nanoparticles can be placed in both the primary fracture and the microfracture. Primary proppant particulates are typically only placed in the primary fracture.

As used herein and in the appended claims, forming a fracture network in the formation means forming a new fracture network or expanding an existing fracture network in some dimension in the formation. The fracture network can include primary fractures, branches of primary fractures, and microfractures, whether induced by the fracturing treatment or naturally occurring. The fracture network is formed within the formation and is in fluid communication with the wellbore. For example, the fracture network is typically formed in a zone of the formation that surrounds the wellbore and propagates from at least one access conduit outwardly from the wellbore. Microfractures tend to extend outwardly from the tip and edges of primary fractures and primary fracture branches in a branching tree-like manner. The microfractures can extend transversely to the trajectories of the primary fractures and primary fracture branches allowing the primary fractures and primary fracture branches to reach and link natural fractures both in and adjacent to the trajectories of the primary fractures and primary fracture branches.

As used herein and in the appended claims, the term "primary fracture" means a fracture that extends from the wellbore and is of a size sufficient to allow primary proppant particulates to be placed therein. The term "primary fracture branch" means a fracture that branches off a primary fracture and is of a size sufficient to allow primary proppant particulates to be placed therein. The term "microfracture" means a natural fracture existing in the formation, or an induced secondary or tertiary fracture, that extends from a primary fracture or a primary fracture branch and is not of a size sufficient to allow primary proppant particulates to be placed therein. Microfractures can exist and be formed in both near-wellbore and far-field regions of the zone. As a result, the microfractures can give more depth and breadth to the fracture network resulting in increased production of hydrocarbons when the well is produced.

Figure 2:
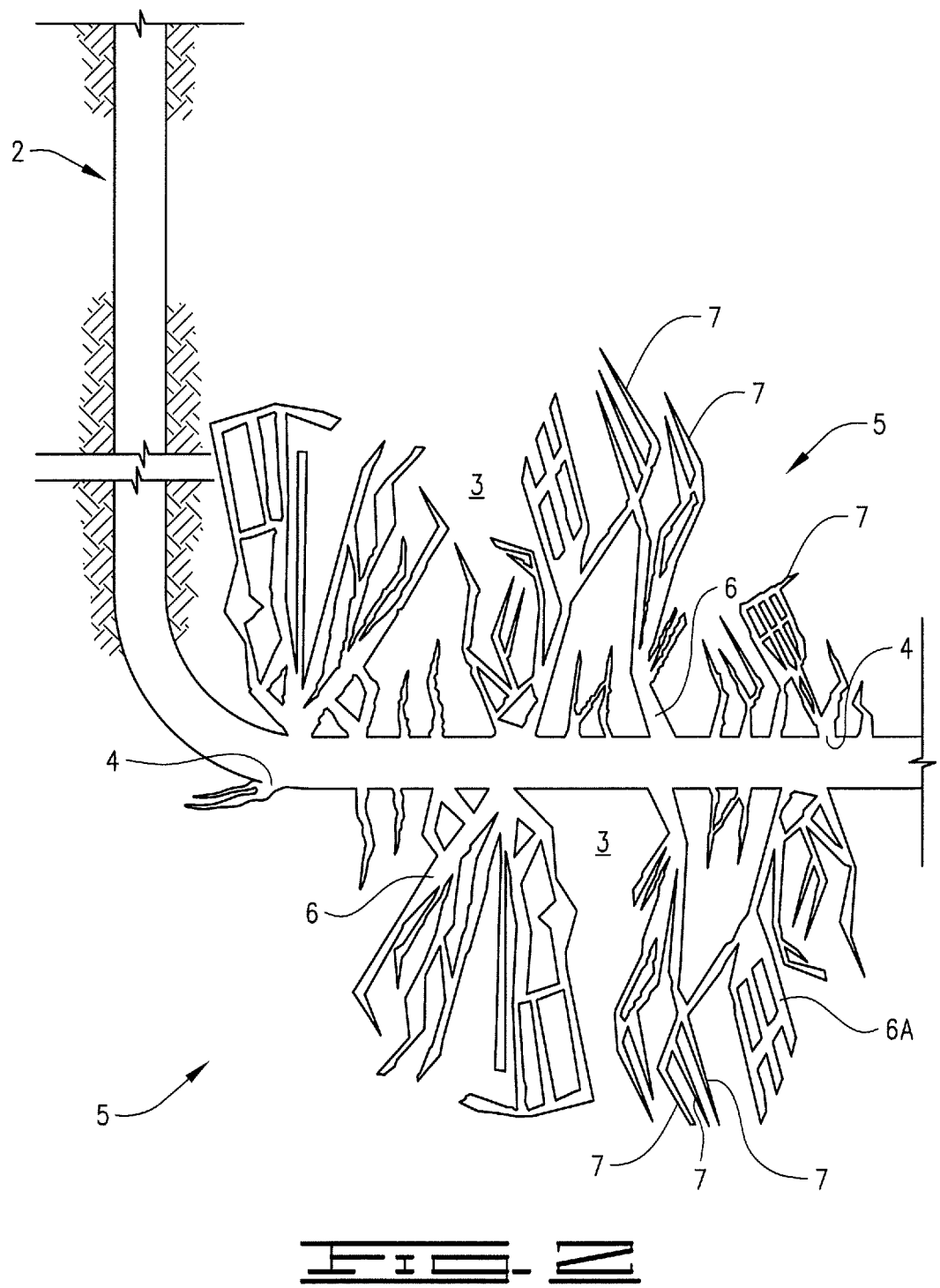
FIG. 2 illustrates a non-limiting example of a shattered fracture network extending from a wellbore into a subterranean formation.

For example, the fracture network may be considered a dendritic fracture network, a shattered fracture network, or any combination thereof. FIG. 1 shows an example of a dendritic fracture network extending from a wellbore 2 into a subterranean formation 3. FIG. 2 shows an example of a shattered fracture network extending from a wellbore 2 into a subterranean formation 3. As shown by each of FIGS. 1 and 2, a plurality of access conduits 4 provides fluid communication between the wellbore 2 and the formation 3. Pumping a fracturing fluid into the formation 3 at a pressure above the fracture gradient of the formation in accordance with the disclosed method forms a fracture network 5 in the formation that includes primary fractures 6, primary fracture branches 6A and microfractures 7. These non-limiting examples illustrate two common types of fracture networks extending from a wellbore. It should be understood that the method disclosed herein is applicable to wellbores at any angle including, but not limited to, vertical wells, deviated wells, highly deviated wells, horizontal wells, and hybrid wells that comprise sections of any combination of the aforementioned wells. For example, the disclosed method may be used in connection with a subterranean formation and wellbore having an existing fracture network.

Mixing a plurality of nanoparticles with the fracturing fluid and placing nanoparticles in the fracture in accordance with the disclosed method can be carried out in any manner known to those skilled in the art with the benefit of this disclosure. For example, the nanoparticles are mixed with the fracturing fluid in an amount at least sufficient to place nanoparticles in the fracture. For example, nanoparticles can be placed in the fracture in accordance with the disclosed method by pumping the fracturing fluid into the formation for a sufficient time and at a sufficient pressure to cause the nanoparticles to be placed in the fracture. The hydraulic pressure placed on the formation forces the fracturing fluid into the fracture. For example, while in place in a microfracture, the nanoparticles help strengthen the integrity of the microfracture faces and provide conductive flow paths thereby maintaining the ability for fluid to flow through the microfracture to the wellbore.

Similarly, mixing a plurality of primary proppant particulates with the fracturing fluid thereby placing primary proppant particulates in the fracture in accordance with the disclosed method can be carried out in any manner known to those skilled in the art with the benefit of this disclosure. For example, the primary proppant particulates are mixed with the fracturing fluid in an amount sufficient to place primary proppant particulates in the fracture. For example, primary proppant particulates can be placed in the fracture in accordance with the disclosed method by pumping the fracturing fluid into the formation for a sufficient time and at a sufficient pressure to cause the primary proppant particulates to be placed in the fracture. The hydraulic pressure placed on the formation during the fracturing treatment forces the fracturing fluid into the fracture. While in place, the primary proppant particulates hold the fracture open thereby maintaining the ability for fluid to flow through the fracture to the wellbore. As used herein and in the appended claims, "placing primary proppant particulates in the fracture" means placing primary proppant particulates in the primary fracture.

For example, the primary particulates mixed with the fracturing fluid can have varying sizes in order to, for example, facilitate the placement of the primary proppant in the primary fracture. For example, the D50 particle size distribution of the primary proppant particulates can be gradually increased as the primary proppant particulates are mixed with the fracturing fluid. For example, if sand is used as the primary particulate, the size of the sand used in the proppant slurry can be gradually increased (for example, 100 mesh to 40/70 mesh to 30/50 mesh) in the proppant slurry stages of the fracturing treatment.

For example, mixing a plurality of nanoparticles with the fracturing fluid and placing nanoparticles in the fracture, and mixing a plurality of primary proppant particulates with the fracturing fluid and placing primary proppant particulates in the fracture in accordance with the disclosed method can be carried out at the same time (that is, in the same stage of the fracturing treatment) or at different times (that is, in different stages of the fracturing treatment). For example, mixing a plurality of nanoparticles with the fracturing fluid thereby placing nanoparticles in the fracture can be carried out prior to mixing a plurality of primary proppant particulates with the fracturing fluid and placing primary proppant particulates in the fracture in accordance with the disclosed method.

For example, the nanoparticles can be mixed with the fracturing fluid in accordance with the disclosed method in an amount in the range of from about 0.01 w/v % to about 10 w/v % of the fracturing fluid. For example, the nanoparticles can be mixed with the fracturing fluid in accordance with the disclosed method in an amount in the range of from about 0.05 w/v % to about 5 w/v % of the fracturing fluid. For example, the nanoparticles can be mixed with the fracturing fluid in accordance with the disclosed method in an amount in the range of from about 0.1 w/v % to about 1.0 w/v % of the fracturing fluid. As used herein and in the appended claims, the weight volume percent (w/v %) of the nanoparticles means the concentration of the nanoparticles in the base carrier fluid and is determined by dividing the volume of the base carrier fluid (for example, in terms of kilograms) into the mass of nanoparticles (for example, in terms of liters) and multiplying the product by 100. For example, assuming that one kilogram of nanoparticles is used for every 1000 liters of the base carrier fluid, then the w/v % of the nanoparticles is 0.1.

Figure 3:
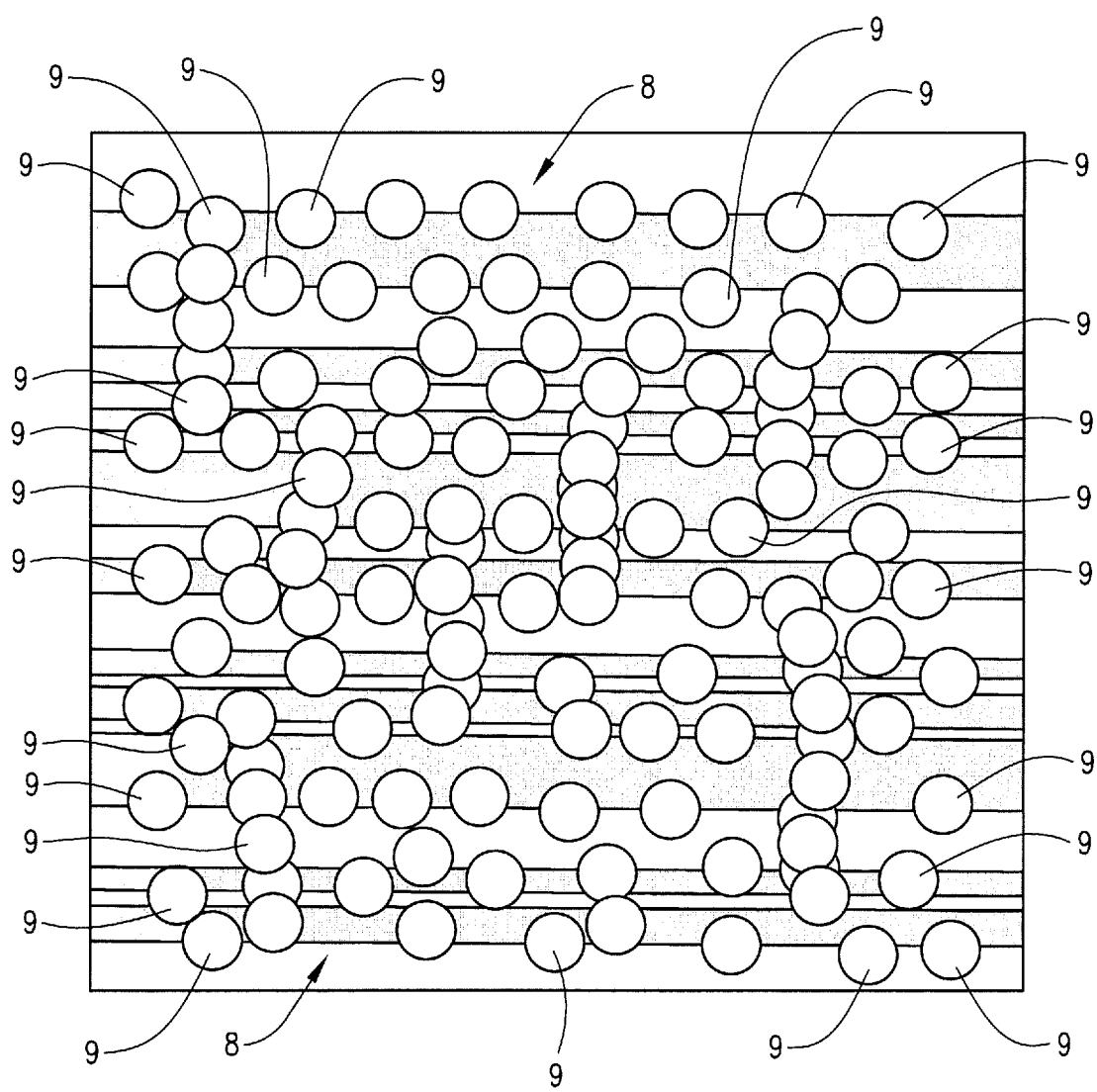
FIG. 3 is a schematic diagram illustrating a permeable membrane formed on the faces of microfractures by the placement of nanoparticles thereon.

For example, when a fracture network is formed in accordance with the disclosed method, the nanoparticles can be mixed with the fracturing fluid in an amount sufficient to penetrate the microfracture and form a permeable membrane on at least a portion of the face of the microfracture. FIG. 3 illustrates a permeable membrane 8 formed by a plurality of nanoparticles 9 on the faces of microfractures in accordance with the disclosed method.

For example, the sizes of the nanoparticles can vary sufficiently to allow a textured membrane to be formed on at least a portion of the face of the microfracture. As used herein and in the appended claims, the "face of a microfracture" means the surfaces of the microfracture.

When a fracture network is formed in accordance with the disclosed method, the method may further comprise the step of: prior to ceasing pumping of the fracturing fluid into the formation, mixing a plurality of micro-proppant particulates with the fracturing fluid and placing micro-proppant particulates in the microfracture. As used herein and in the appended claims, the term "micro-proppant particulate" means a particulate having a D50 particle size distribution of less than 100 microns. For example, the micro-proppant particulates can become part of the permeable membrane that is formed on at least a portion of the face of the microfracture by nanoparticles placed in the microfracture. For example, the D50 particle size distribution size of the micro-proppant particulates added to the fracturing fluid can be gradually increased (for example, one micron to 25 microns to 95 microns) in either the pad fluid or the proppant slurry stages of the fracturing treatment. The larger size of the micro-proppant particulates helps form a more effective membrane.

The micro-proppant particulates can be mixed with the fracturing fluid and micro-proppant particulates can be placed in the microfracture in any manner known to those skilled in the art with the benefit of this disclosure. For example, the micro-proppant particulates can be placed in the microfracture in accordance with the disclosed method by pumping the fracturing fluid into the formation for a sufficient time and at a sufficient pressure to cause the micro-proppant particulates to be placed in the microfracture. The hydraulic pressure placed on the formation forces the fracturing fluid into the microfracture. For example, while in place, the micro-proppant particulates hold or help hold the microfracture open or act with micro-proppant particulates to form a textured membrane on at least a portion of the face of the microfracture to hold the microfracture open thereby maintaining the ability for fluid to flow through the microfracture to the wellbore. For example, micro-proppant particulates can be placed in both the primary fracture and the microfracture.

For example, a plurality of micro-proppant particulates can be mixed with the fracturing fluid and micro-proppant particulates can be placed in the microfracture in accordance with the disclosed method in the same or a different stage of the fracturing treatment in which a plurality of nanoparticles are mixed with the fracturing fluid and nanoparticles are placed in the microfracture and in which a plurality of primary proppant particulates are mixed with the fracturing fluid and primary proppant particulates are placed in the primary fracture in accordance with the disclosed method. For example, mixing a plurality of nanoparticles with the fracturing fluid and placing nanoparticles in the fracture, and mixing a plurality of micro-proppant particulates with the fracturing fluid and placing micro-proppant particulates in the microfracture can be carried out in the same stage or different stages of the fracturing treatment before mixing a plurality of primary particulates with the fracturing fluid and placing primary particulates in the fracture in accordance with the disclosed method.

For example, the nanoparticles and micro-proppant particulates can be separately mixed with the fracturing fluid and placed in the microfracture at the same time. Alternatively, the nanoparticles and micro-proppant particulates can be pre-mixed together, at the well site or at a remote location, to form a nanoparticle/micro-proppant particulate mixture. The nanoparticle/micro-proppant particulate mixture can then be mixed with the fracturing fluid to thereby mix a plurality of nanoparticles with the fracturing fluid and place nanoparticles in the microfracture, and also mix a plurality of micro-proppant particulates with the fracturing fluid and place micro-proppant particulates in the microfracture. For example, the nanoparticles and micro-proppant particulates can be pre-mixed together in a base carrier fluid (for example, water), at the well site or at a remote location, to form a nanoparticle/micro-proppant particulate slurry. The resulting nanoparticle/micro-proppant particulate slurry can then be mixed with the fracturing fluid to thereby mix a plurality of nanoparticles with the fracturing fluid and place nanoparticles in the microfracture, and also mix a plurality of micro-proppant particulates with the fracturing fluid and place micro-proppant particulates in the microfracture.

For example, a plurality of nanoparticles can be mixed with the fracturing fluid and nanoparticles can be placed in the microfracture in accordance with the disclosed method first. The nanoparticles can be mixed with the fracturing fluid in an amount sufficient to form a permeable membrane on at least a portion of the face of the microfracture. If desired, the sizes of the nanoparticles can be varied sufficiently to allow a textured membrane to be formed on at least a portion of the face of the microfracture.

Next, in the same or a separate stage, a plurality of micro-proppant particulates can be mixed with the fracturing fluid and micro-proppant particulates can be placed in the microfracture in accordance with the disclosed method. The micro-proppant particulates can be mixed with the fracturing fluid in an amount sufficient to help form a permeable membrane on at least a portion of the face of the microfracture. If desired, the sizes of the micro-proppant particulates can be varied sufficiently to help facilitate the formation of a textured membrane on at least a portion of the face of the microfracture.

Finally, a plurality of primary particulates can be mixed with the fracturing fluid and primary particulates can be placed in the primary fracture in another stage of the fracturing treatment. If desired, the sizes of the primary proppant particulates can be varied.

For example, the fracturing fluid pumped into the formation in accordance with the disclosed method can be a pad fracturing fluid. The pad fracturing fluid can be pumped into the formation in stages. The nanoparticles can be mixed with the pad fracturing fluid in accordance with the disclosed method in any one or all of the pad fluid stages. Similarly, the micro-proppant particulates can be mixed with the pad fracturing fluid in accordance with the disclosed method in any one or all of the pad fluid stages. For example, including micro-proppant particulates in the pad fracturing fluid places the micro-proppant particulates in the fissure openings to and otherwise in the microfractures once they are opened or created.

For example, the nanoparticles and micro-proppant particulates can be mixed with the pad fracturing fluid in the initial stage of pumping the pad fracturing fluid into the formation, that is, before the pad fracturing fluid first fractures the formation and forms the fracture network therein. However, it may be desirable for the pad fracturing fluid that is pumped into the formation in the initial stage of the pad fluid treatment to be free of proppant particulates of any size, or at least free of micro-proppant particulates. In this case, the nanoparticles and/or micro-proppant particulates can be mixed with the pad fracturing fluid in one or more subsequent stages of the pad fluid treatment or with the proppant slurry in one or more of the proppant slurry stages of the fracturing treatment.

For example, the pad fracturing fluid pumped into the formation in accordance with the disclosed method can be transitioned to the proppant slurry without ceasing the pumping process or otherwise reducing the hydraulic pressure placed on the formation by the fracturing treatment. As known to those skilled in the art with the benefit of this disclosure, if needed or desired, a pill can be pumped into the formation following pumping of the pad fracturing fluid and prior to pumping of the proppant slurry in order to allow the transition from the pad fracturing fluid to the proppant slurry to be made.

Ceasing pumping of the proppant slurry into the subterranean formation in accordance with the disclosed method causes the pressure at which the proppant slurry is pumped into the formation to fall below the fracture gradient of the formation. For example, once pumping of the proppant slurry into the formation is ceased, or the pressure in the formation is otherwise caused to fall below the fracture gradient of the formation, primary fractures tend to close on top of primary proppant particulates therein and microfractures tend to close on top of the micro-proppant particulates therein (or on top of a membrane formed of nanoparticles and/or micro-proppant particulates). The conductive channels formed by the nanoparticles, primary proppant particulates and micro-proppant particulates (when used) allows hydrocarbons to flow through the fracture network to the wellbore and ultimately to the surface where they can be recovered.

For example, the nanoparticles used in the disclosed method have a D50 particle size distribution of in the range of from about 0.1 nanometers to about 500 nanometers, or any subset therebetween. For example, the nanoparticles used in the disclosed method have a D50 particle size distribution of in the range of from about 1 nanometer to about 100 nanometers, or any subset therebetween. For example, the nanoparticles used in the disclosed method have a D50 particle size distribution of in the range of from about 5 nanometers to about 20 nanometers, or any subset therebetween.

For example, the primary proppant particulates used in the disclosed method have a D50 particle size distribution of in the range of from 100 microns to about 1200 microns, or any subset therebetween. For example, the primary proppant particulates used in the disclosed method have a D50 particle size distribution of in the range of from about 150 microns to about 750 microns, or any subset therebetween. For example, the primary proppant particulates used in the disclosed method have a D50 particle size distribution of in the range of from about 175 microns to about 400 microns, or any subset therebetween. Apart from the above definition of primary proppant particulates, the modifier "primary" should not be construed as limiting in any way.

The micro-proppant particulates have a size sufficient to allow the particulates to be placed in the microfracture(s). For example, the micro-proppant particulates used in the disclosed method have a D50 particle size distribution of in the range of from about 1 micron to about 99 microns, or any subset therebetween. For example, the micro-proppant particulates used in the disclosed method have a D50 particle size distribution of in the range of from about 5 microns to about 75 microns, or any subset therebetween. For example, the micro-proppant particulates used in the disclosed method have a D50 particle size distribution of in the range of from about 5 microns to about 50 microns, or any subset therebetween.

For example, the D50 particle size distribution of the micro-proppant particulates used in the disclosed method can be selected to be small enough to mitigate any potential plugging by the micro-proppant particulates as they pass through sand packs formed by the primary proppant particulates. For example, the D50 particle size distribution of the micro-proppant particulates to be used in the disclosed method can be selected to be approximately one third (⅓) to one fifth (⅕) of the pore throat diameter of proppant packs formed by the primary proppant particulates.

For example, the base carrier fluid of the fracturing fluid provided in accordance with the disclosed method, including in the pad fluid stages and the proppant slurry stages, can be an aqueous-based base carrier fluid or an oil-based base carrier fluid. The aqueous-based base carrier fluid or oil-based base carrier fluid can include an aqueous-miscible fluid, a water-in-oil emulsion, or an oil-in-water emulsion.

For example, the base carrier fluid of the fracturing fluid used in the disclosed method can be an aqueous-based base carrier fluid. For example, the base carrier fluid of the fracturing fluid can be water. The water can come from a variety of sources. For example, the water can be fresh water, saltwater (for example, water containing one or more salts dissolved therein), brine (for example, saturated saltwater or produced water), seawater, brackish water, produced water (for example, water produced from a subterranean formation), formation water, treated flowback water, and mixtures thereof.

For example, the base carrier fluid of the fracturing fluid used in the disclosed method can be an oil-based base carrier fluid. Suitable oil base carrier fluids include alkanes, olefins, aromatic organic compounds, cyclic alkanes, paraffins, diesel fluids, mineral oils, desulfurized hydrogenated kerosenes, and any combination thereof.

Suitable aqueous-miscible fluids for use in connection with the base carrier fluid of the fracturing fluid used in the disclosed method include alcohols such as methanol, ethanol, n-propanol, isopropanol, n-butanol, sec-butanol, isobutanol, and t-butanol; glycerins; glycols such as polyglycols, propylene glycol, and ethylene glycol; polyglycol amines; polyols; combinations of such compounds with salts such as sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; and combinations thereof.

Suitable water-in-oil emulsions, also known as invert emulsions, for use in connection with the base carrier fluid of the fracturing fluid used in the disclosed method may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base carrier fluid, where the amount may range from any lower limit to any upper limit and encompass any subset therebetween. It should be noted that for water-in-oil and oil-in-water emulsions, any mixture of the above may be used, including the water being and/or comprising an aqueous-miscible fluid.

For example, if needed or desired, the density of the base carrier fluid can be adjusted, for example, to provide additional particulate transport and suspension in the fluid. For example, the pH of the base carrier fluid can be adjusted (for example, by a buffer or other pH adjusting agent), for example, to activate a crosslinking agent and/or to reduce the viscosity of the fluid (for example, to activate a breaker or deactivate a crosslinking agent). For example, the pH may be adjusted to a specific level, which may depend on, among other factors, the types of gelling agents, acids, and other additives included in the base fluid. One of ordinary skill in the art, with the benefit of this disclosure, will recognize when such density and/or pH adjustments are appropriate.

The components of the fracturing fluid can be mixed together in any stage of the fracturing treatment by any method known to those skilled in the art with the benefit of this disclosure. For example, a pad fracturing fluid, proppant slurry or both can be formed at the well site including on the fly as they are pumped into the wellbore and the fracturing treatment is carried out. For example, the nanoparticles, micro-proppant particulates and the primary proppant particulates can be incorporated into one or more slurries that are dispersed into the pad fracturing fluid and proppant slurry, as appropriate, on the fly as the pad fracturing fluid and proppant slurry are pumped into the wellbore. For example, the nanoparticles and micro-proppant particulates can be delivered to the well site in slurry form.

The Nanoparticles

The nanoparticles used in the disclosed method can be formed of a variety of elements, compounds and/or materials (collectively "materials"). For example, the same types of materials that are used to form primary proppant particulates and/or micro-proppant particulates, as set forth herein, can also be used to form nanoparticles for use in connection with the method disclosed herein. The shapes of the nanoparticles used can be selected to correspond to the pore structure of the formation to be fractured in accordance with the present method.

For example, the nanoparticles used in the disclosed method can be formed of a material selected from the group consisting of silica, silicon oxide, aluminum, iron, titanium, metal oxides, metal hydroxides and graphene. For example, the nanoparticles used in the disclosed method can be formed of a material selected from the group consisting of silica, silicon oxide, aluminum oxide and graphene. For example, the nanoparticles used in the disclosed method can consist of or include nanoparticles formed of silica. Silica nanoparticles are relatively inexpensive and commercially available.

For example, the nanoparticles mixed with the fracturing fluid can consist of or include amphiphobic nanoparticles. As used herein and in the appended claims, an amphiphobic nanoparticle means a nanoparticle that is both hydrophobic and lipophobic, that is, a nanoparticle that is repellent to both water and oil. For example, the hydrophobic nature of the amphiphobic nanoparticles facilitates the recovery of the fracturing fluid from the formation. The lipophobic nature of the amphiphobic nanoparticles facilitates the recovery of hydrocarbons from the fracture.

For example, the amphiphobic nanoparticles used in connection with the present method can be formed of a material that is naturally amphiphobic. Alternatively, the amphiphobic nanoparticles used in connection with the present method can be formed by coating nanoparticles that are not amphiphobic, such as many of the types of nanoparticles set forth above, with an amphiphobic coating. The nanoparticles can be partially or completely coated with the amphiphobic coating.

For example, both the naturally amphiphobic material and the material used to form an amphiphobic coating for use herein can be selected from the group consisting of silicon dioxide solvated in a solvent such as ethanol, organosiloxanes, fluoropolymers, fluorinated compounds including fluorinated hydrocarbons, fluorosilanes, fluoroalkylsilanes, fluorosiloxanes, flourosilazane tetrafluoroethylene/(perfluoroalkyl) vinyl ether copolymers, perfluoroalkyl phosphates, perfluoroalcohol phosphates, perfluoroalkyl ethyl methacrylates, polyfluoroalkylethyl methacrylate/alkylmethacrylate copolymers, polyalkoxysilane methacrylate/perfluorooctyl methacrylate, perfluoroalcohol phosphates, mixtures of perfluoroalcohol phosphates and polysiloxanes, mixtures of perfluoroalcohol phosphates and acrylate silicone copolymers, tetrafluoroethylene/hexafluoropropylene copolymer, polytetrafluoroethylene, polyxylylene, fluorinated polyhedral oligomeric silsesquioxanes, and combinations thereof. Examples of metal oxides that can be used include zinc oxide and titanium oxide. For example, a suitable polytetrafluoroethylene is sold under the brand name Teflon® by Chemours. An example of a fluorosilane that can be used is perfluoroalkylsilane.

For example, an amphiphobic coating for use herein can also be formed of a combination of one or more hydrophobic materials and one or more lipophobic materials. Any suitable hydrophobic and lipophobic materials can be used.

For example, the nanoparticles can be treated with an amphiphobic coating before the nanoparticles are mixed with the fracturing fluid. For example, the nanoparticles can be pre-treated with the amphiphobic coating at a separate facility and shipped to the well site. The nanoparticles can also be treated with the amphiphobic coating at the site of the well, for example, by mixing slurries of the nanoparticles and the amphiphobic coating in a mixing tank and adding the resulting coated nanoparticles to the fracturing fluid from the mixing tank.

For example, the nanoparticles used in the disclosed method can consist of or include nanoparticles that have been treated with at least one chemical additive that can be released onto the face of the fracture to treat the face of the fracture. In this way, the chemical additive(s) are delivered to the face of the fracture to treat the face of the fracture. For example, chemical additive(s) can be released onto the face of the fracture to modify the surface phobicity and wettability of the face of the fracture in order to facilitate removal of the fracturing fluid from the formation and enhance the ultimate production of oil and gas from the formation. For example, chemical additive(s) can be released onto the face of the fracture to stabilize the face of the fracture to help the fracture maintain its integrity under the closure stresses created during production of the well.

For example, nanoparticles can be treated with one or more chemical additives selected from the group consisting of clay stabilizers, formation consolidating agents, agglomerating agents, amphiphobic generating agents, in-situ gas and heat generating agents, in-situ acid generators, chelating agents, dewatering surfactants, oil-chisel surfactants, fines migration control agents, scale inhibitors, corrosion inhibitors, hydrate inhibitors, paraffin inhibitors, rheology modifiers and catalysts. For example, suitable fines migration control agents include silanes.

For example, nanoparticles can be treated with at least one chemical additive as set forth above by at least partially coating the nanoparticles with the chemical additive(s). For example, nanoparticles can be treated with at least one chemical additive as set forth above by injecting the chemical additive(s) into the nanoparticles.

For example, the nanoparticles used in the disclosed method can consist of or include mesoporous silica nanoparticles. A mesoporous silica nanoparticle is a hollow silica nanoparticle that includes a pore network. One or more chemical additives can be loaded into the hollow interior and/or the pores of the nanoparticle. As a result, such a nanoparticle has a high capacity for chemical delivery to target areas within a fracture network. Due to its pore network, a silica mesoporous nanoparticle has a relatively large surface area and enhanced absorbing ability (as compared to other types of nanoparticles). Such a nanoparticle also includes a silanol-containing surface that allows for further surface modification. As a result, a variety of chemical additives useful for treating the surfaces of fractures formed during the fracturing treatment can be loaded into a plurality of mesoporous silica nanoparticles and delivered to the fracture faces in accordance with the disclosed method. Chemical-laden particulates can be injected deep into microfractures.

For example, the nanoparticles used in the disclosed method can consist of or include mesoporous silica nanoparticles that have been treated with at least one chemical additive as set forth above by impregnating the mesoporous silica nanoparticles with the chemical additive(s). For example, the nanoparticles used in the disclosed method can consist of or include mesoporous silica nanoparticles that have been treated with at least one chemical additive as set forth above by impregnating the pores of the mesoporous silica nanoparticles with the chemical additive(s). For example, the nanoparticles used in the disclosed method can consist of or include mesoporous silica nanoparticles that have been treated with at least one chemical additive as set forth above by impregnating the hollow interiors of the nanoparticles with the chemical additive(s). For example, the nanoparticles used in the disclosed method can consist of or include mesoporous silica nanoparticles that have been treated with at least one chemical additive as set forth above by impregnating both the pores and the hollow interiors of the nanoparticles with the chemical additive(s).

The chemical additive(s) are released into the fracture and onto the face of the fracture and treat the face of the fracture when the nanoparticles are placed in the fracture. Alternatively, the release of some or all of the chemical additive(s) onto the face of the fracture when the nanoparticles are placed in the fracture can be delayed.

For example, the release of some or all of the chemical additive(s) onto the face of the fracture when the nanoparticles are placed in the fracture can be delayed by at least partially coating the additive loaded nanoparticles with a temporary sealing agent. As used herein and in the appended claims, the term "temporary sealing agent" means a component that initially prevents the chemical additive(s) from being released onto the face of the fracture when the nanoparticles are placed in the fracture but slowly dissolves or degrades to allow the chemical additive(s) to be released onto the face of the fracture over time. The approximate time it takes for the temporary sealing agent to dissolve or degrade and for the chemical additive(s) to be released onto the face of the fracture will vary depending on, for example, the nature of the temporary sealing agent, the thickness of the coating and formation conditions. For example, the nature of the temporary sealing agent and the thickness of the coating thereon used can be chosen specifically to control the approximate time it takes for the temporary sealing agent to dissolve or degrade and for the chemical additive(s) to be released onto the face of the fracture.

For example, the temporary sealing agent can be selected from the group consisting of hydrophobic films, degradable materials and inorganic salt that will slowly degrade or be dissolved by one or more fluids in the fracture. Examples of suitable hydrophobic materials include polyvinyl fluoride, polyvinylidene fluoride, and fluoroalkyl silanes (for example, fluoroalkyl silanes that have low-surface energy). Examples of suitable degradable materials include agropolymers, biopolyesters, polyhydroxybutyrate, polylactic acid, polyglycolic acid, and polyanhydrides. Examples of suitable inorganic salts include potassium phosphate, calcium carbonate, and ammonium hydrogen phosphate.

The Primary Proppant Particulates

The primary proppant particulates used in the disclosed method can be any type of proppant particulate suitable for use in propping open primary fractures in subterranean formations, including conventional proppant particulates as known to those skilled in the art. Suitable primary proppant particulates include all shapes of materials, including substantially spherical materials, low to high aspect ratio materials, fibrous materials, polygonal materials (such as cubic materials), and mixtures thereof.

For example, the primary proppant particulates used in the disclosed method can be can be selected from the group of sand, walnut hulls, resin pre-coated proppant particulates, man-made proppant particulates, and mixtures thereof. For example, the primary proppant particulates of the aqueous based proppant slurry disclosed herein can be natural sand.

For example, the primary proppant particulates used in the disclosed method can be or include degradable materials. Suitable degradable materials include, for example, materials that deform or melt upon heating such as thermoplastic materials, hydrolytically degradable materials, materials degradable by exposure to radiation, materials reactive to acidic fluids, or any combination thereof. For example, the degradable materials can be degraded or degradation of the materials may be initiated by temperature, presence of moisture, oxygen, microorganisms, enzymes, pH, free radicals, a delayed-release acid, such as an acid-releasing degradable material or an encapsulated acid or a treatment fluid subsequently introduced into formation.

Examples of degradable polymers that can be used as primary proppant particulates in accordance with the method disclosed herein include, but are not limited to, polysaccharides such as cellulose, chitin, chitosan, and proteins. Specific examples include homopolymers and random, block, graft, and star- and hyper-branched aliphatic polyesters. Additional examples of suitable degradable polymers include, but are not limited to, aliphatic polyesters; poly (lactides); poly(glycolides); poly(E-caprolactones); poly (hydroxy ester ethers); poly(hydroxybutyrates); poly(anhydrides); polycarbonates; poly(orthoesters); poly(amino acids); poly(ethylene oxides); poly(phosphazenes); poly (ether esters), polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. The term "derivative" is used herein to include any compound that is made from one of the listed compounds, for example, by replacing one atom in the base compound with another atom or group of atoms.

For example, primary proppant particulates used in the disclosed method can be formed of aliphatic polyesters such as poly(lactic acid), poly(anhydrides), poly(orthoesters), or poly(lactide)-co-poly(glycolide) copolymers, and combinations thereof. For example, primary proppant particulates used in the disclosed method can be formed of poly(lactic acid), poly(orthoesters), and combinations thereof. In choosing an appropriate degradable material, one should consider the degradation products that will result and whether the degradation material will adversely affect other operations or components.

For example, the primary proppant particulates can be mixed with the fracturing fluid in accordance with the disclosed method in an amount in the range of from about 0.01 pounds to about 6 pounds per gallon of the slurry. For example, the primary proppant particulates can be mixed with the fracturing fluid in an amount in the range of from about 0.01 pounds to about 1 pound per gallon of the slurry. For example, primary proppant particulates can be mixed with the fracturing fluid in an amount in the range of from about 0.025 pounds to about 0.1 pounds per gallon of the slurry.

The Micro-proppant Particulates

The micro-proppant particulates used in the disclosed method can be any type of micro-proppant particulates suitable for use in propping open microfractures in subterranean formations as known to those skilled in the art with the benefit of this disclosure. Suitable micro-proppant particulates include all shapes of materials, including substantially spherical materials, low to high aspect ratio materials, fibrous materials, polygonal materials (such as cubic materials), and mixtures thereof. For example, the types of proppant particulates typically used as primary proppant particulates can be used as micro-proppant particulates. The micro-proppant particulates can also be generated in the fracturing fluid.

Examples of micro-proppant particulates that can be used include sand (for example natural sand), bauxite, ceramic proppant materials, glass materials, polymer materials, polytetrafluoroethylene materials, fly ash, silica flour, seed shell pieces, fruit pit pieces, composite particulates including wood composite particulates, nut shell pieces including walnut hulls (for example, ground walnut hulls), resin pre-coated proppant particulates such as resin pre-coated sand, man-made non-degradable proppant particulates, and mixtures thereof. Examples of man-made proppant particulates include bauxite, ceramics, and polymeric composite particulates. Suitable composite particulates include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

For example, the micro-proppant particulates can be selected from the group consisting of silica flour, glass beads, fly ash, ceramics, bauxite, polymer materials, polymeric composites, mica, and combinations thereof. For example, the micro-proppant particulates can be selected from the group consisting of silica flour, fly ash, ceramics, polymeric composites and combinations thereof. Examples of commercially available micro-proppant particulates that can be used in the disclosed method include micro-proppant particulates manufactured by Zeeospheres Ceramics, LLC and sold as "Zeeospheres N-200" and "Zeeospheres N-600."

For example, the micro-proppant particulates can be mixed with the fracturing fluid in accordance with the disclosed method in an amount in the range of from about 0.01 pounds to about 2 pounds per gallon of the fracturing fluid. For example, the micro-proppant particulates can be mixed with the fracturing fluid in an amount in the range of from about 0.05 pounds to about 1.0 pound per gallon of the fracturing fluid. For example, the micro-proppant particulates can be mixed with the fracturing fluid in an amount in the range of from about 0.1 pounds to about 0.5 pounds per gallon of the fracturing fluid.

The concentration of the micro-proppant particulates present in the fracturing fluid (for example, in each of the pad fracturing fluid and the proppant slurry) should be no greater than the critical bridging concentration of the micro-proppant particulates in the subterranean formation. By assuring that the concentration of the micro-proppant particulates in the proppant slurry is sufficiently low, the micro-proppant particulates will not undermine or plug the pore spaces of the proppant pack.

In an alternative embodiment of the method disclosed herein, a plurality of mesoporous silica nanoparticles is mixed with the fracturing fluid and mesoporous silica nanoparticles are placed in the fracture by associating the mesoporous silica nanoparticles with at least some of the proppant particulates (primary proppant particulates and/or micro-proppant particulates) that are mixed with the fracturing fluid and placed in the fracture. The mesoporous silica nanoparticles contain at least one chemical additive that can be released into the fracture and onto the face of the fracture when the mesoporous silica nanoparticles are placed in the fracture with the proppant particulates.

The chemically loaded mesoporous silica nanoparticles can be associated with the proppant particulates by attaching the mesoporous silica nanoparticles to the proppant particulates or coating the mesoporous silica nanoparticles onto the surfaces of the proppant particulates. For example, the chemically loaded mesoporous silica nanoparticles can be coated onto the surfaces of the primary proppant and/or micro-proppant particulates by first coating the surfaces of primary proppant or micro-proppant with a tackifying agent or a binding agent and then blending the mesoporous silica nanoparticles with the primary proppant and/or micro-proppant.

Additional Components

As known to those skilled in the art with the benefit of this disclosure, various additional components can be included in the fracturing fluid, including in the pad fluid stages and in the proppant slurry stages. For example, additives can be included in the fracturing fluid, in order to, for example, reduce pumping friction, make it easier to pump the fluid through the wellbore and into the formation, reduce or eliminate the fluid's reaction to the formation, enhance the ability of the fluid to fracture the formation and keep the fractures open during and following the fracturing treatment, enhance the ability of the fluid to place the nanoparticles and proppant particulates (including the micro-proppant particulates and the primary proppant particulates) in the fracture, and make it even easier to remove the fluid and any broken down gels and the like from the formation once the fracturing treatment is complete.

For example, the fracturing fluid can include a friction reducing agent in all stages of the fracturing treatment. Examples of friction reducing agents that can be used include polysaccharides, polyacrylamides and combinations thereof. Gelling agents can also be used as friction reducing agents.

For example, in order to facilitate consolidation of the primary proppant particulates in the primary fracture in accordance with the method disclosed herein, the primary proppant particulates can be coated with a consolidating agent, and the disclosed method can further comprise the step of allowing the primary proppant particulates to consolidate in the primary fracture. The micro-proppant particulates used in the fracturing fluid can also be coated with a consolidating agent, and the disclosed method can further comprise the step of allowing the micro-proppant particulates to consolidate in the microfracture.

As used herein and in the appended claims, "coated with a consolidating agent" means partially coated or fully coated with the consolidating agent. Any portion of the proppant particulates as a whole may be coated with a consolidating agent. The term "coating" and the like does not imply any particular degree of coating on the proppant particulates. In particular, the terms "coat" or "coating" do not imply 100% coverage by the coating on the particulates. For example, at least a majority of the proppant particulates can be at least partially coated with a consolidating agent and allowed to consolidate in-situ within the formation to form a hardenable permeable or impermeable mass. The consolidating agent enhances the effectiveness of the proppant particulates in propping open the fracture and prevents the proppant particulates from flowing back into the wellbore.

Any type of consolidating agent that will enable the proppant particulates to consolidate within a fracture in the formation can be used. For example, the proppant particulates can be either pre-coated with the consolidating agent or coated with the consolidating agent on the fly as the proppant slurry (or the pad fluid in the event the micro-proppant particulates in the pad fluid are coated with a consolidating agent) is formed and pumped into the wellbore.

Consolidating agents suitable for use in the disclosed method generally comprise any compound that is capable of minimizing particulate migration. For example, the consolidating agent can be selected from the group consisting of a curable resin, a tackifying agent, and mixtures thereof. Suitable curable resins can be selected from the group consisting of epoxies, furans, phenolics, furfuryl aldehydes, furfuryl alcohols, and mixtures thereof. For example, the consolidating agent can be selected from the group consisting of epoxies, furans, phenolics, and mixtures thereof. Suitable tackifying agents can be selected from the group consisting of polyamides, polyesters, polycarbonates, natural resins, zeta-potential reducing agents, and mixtures thereof. For example, the tackifying agent can be selected from the group consisting of polyamides, polyesters, polycarbonates, and mixtures thereof.

Examples of commercially available consolidating agents that can be used include SANDWEDGE® (an adhesive substance, available from Halliburton Energy Services, Inc.) and EXPEDITE® (a two-component resin system, available from Halliburton Energy Services, Inc.).

The type and amount of consolidating agent to be used may depend upon, among other factors, the composition and/or temperature of the subterranean formation, the chemical composition of formation fluids, the flow rate of fluids present in the formation, the effective porosity and/or permeability of the subterranean formation, the pore throat size and distribution associated with the formation, and the like. Furthermore, the concentration of the consolidating agent can be varied, inter alia, to either enhance bridging to provide for a more rapid coating of the consolidating agent or to minimize bridging to allow deeper penetration into the subterranean formation. It is within the ability of one skilled in the art, with the benefit of this disclosure, to determine the type and amount of consolidating agent to use in coating the proppant particulates used in the disclosed method to achieve the desired results.

For example, the consolidating agent can be used to facilitate the consolidation of the primary proppant particulates into a proppant pack in the primary fracture. As used herein and in the appended claims, the term "proppant pack" refers to a collection of proppant particulates consolidated together within a fracture. For example, the size and nature of the proppant pack can vary depending, in part, upon the specific consolidating agent used and the size of the primary proppant particulates.

In wells with or projected to have high production flow rates, for example, a curable resin may be desirable for use as the consolidating agent to prevent any potential break up of the proppant mass. For example, in wells with or projected to have low production flow rates, it may be desirable to use a tackifying agent as the consolidating agent. In one embodiment, a portion of the primary proppant particulates used in the proppant slurry are coated with a curable resin, as stated above, and a portion of the primary proppant particulates used in the proppant slurry are coated with a tackifying agent, as stated above.

For example, the primary proppant particulates initially used in the treatment (for example, early in the proppant stage of a fracturing treatment) can be coated with a tackifying agent. At some point during the treatment (for example, the tail-end stage of a fracturing treatment), the primary proppant particulates used can be coated with a curable resin. In another embodiment, the primary proppant particulates can be intermittently coated with a curable resin or a tackifying agent as the proppant slurry is injected into the formation on the fly.

The proppant particulates (including the primary proppant particulates and micro-proppant particulates when they are coated with a consolidating agent) can be allowed to consolidate in the fracture by allowing a sufficient time for the consolidating agent to act (and a proppant pack to form, for example) before the fracture is allowed to close. For example, if a curable resin is used as the consolidating agent, it functions to consolidate proppant particulates and hold them together within the fracture as it hardens and cures within the fracture. If a tackifying agent is used, it causes the proppant particulates to cling together within the fracture.

For example, the fracturing fluid used in the proppant slurry stages can further include a cross-linkable gelling agent, a cross-linker and a gel breaker, and the proppant slurry can be pumped into the subterranean formation in a manner such that the gelling agent cross-links to form a cross-linked gel and increase the viscosity of the proppant slurry in the formation. If a cross-linkable gel is used, the disclosed method further comprises the steps of allowing the cross-linked gel to break down, thereby decreasing the viscosity of the proppant slurry, and flowing back the well to remove the broken gel in the proppant slurry from the fracture.

The cross-linkable gelling agent and cross-linker can be any cross-linkable gelling agent and cross-linker known to those skilled in the art to form a cross-linked gel in fracturing fluids and thereby enhance the viscosity of the fluids in the formation. For example, the cross-linkable gelling agent gels the base aqueous fluid in the proppant slurry and thereby increases its viscosity. For example, the cross-linker functions to crosslink the gel and thereby further increase the viscosity of the base fluid. For example, the increased viscosity of the base fluid allows the base fluid to transport higher quantities of primary particulate material. Individuals skilled in the art, with the benefit of this disclosure, will recognize the exact types and amounts of cross-linkable gelling agent and cross-linker to use, depending on factors such as the specific components used, the desired viscosity, and formation conditions.

A variety of cross-linkable gelling agents can be used, including biopolymers, synthetic polymers, or a combination thereof. Examples of suitable cross-linkable gelling agents include hydratable polymers that contain one or more functional groups, such as hydroxyl, carboxyl, sulfate, sulfonate, amino, amide, phosphate, phosphonate, amino, and amide groups. Additional examples of suitable cross-linkable gelling agents include biopolymers that include polysaccharides or derivatives thereof that contain one or more of the following monosaccharide units: galactose, mannose, glucoside, glucose, xylose, arabinose, fructose, glucuronic acid, and pyranosyl sulfate. Additional examples of suitable polymers that can be used as the cross-linkable gelling agents include, but are not limited to, xanthan gum, guar gum and derivatives thereof (such as hydroxypropyl guar and carboxymethylhydroxypropyl guar), and cellulose derivatives (such as hydroxyethyl cellulose). Additionally, synthetic polymers and copolymers that contain the above-mentioned functional groups can be used. Examples of such synthetic polymers include, but are not limited to, polyacrylate, polymethacrylate, polyacrylamide, polyvinyl alcohol, and polyvinylpyrrolidone. As a further example, the cross-linkable gelling agent molecule may be depolymerized. The term "depolymerized," as used herein, generally refers to a decrease in the molecular weight of the gelling agent molecule.

For example, the cross-linkable gelling agent can be added to the proppant slurry in an amount in the range of from about 0.1% to about 5% by weight, based on the weight of the water in the fracturing fluid. For example, the cross-linkable gelling agents can be added to the proppant slurry in an amount in the range of from about 0.01% to about 2% by weight, based on the weight of the water in the fracturing fluid.

Similarly, a variety of cross-linkers can be used. The cross-linker functions to crosslink the cross-linkable gelling agent in the proppant slurry to form a cross-linked gel in the proppant slurry. Suitable cross-linkers comprise at least one metal ion that is capable of crosslinking the cross-linkable gelling agent. Examples include, but are not limited to, borate compounds (such as, for example, alkaline earth metal borates, alkali metal-alkaline earth borates, and mixtures thereof); zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; and combinations thereof. Further examples of suitable borate compounds include probertite, ulexite, nobleite, frolovite, colemanite, calcined colemanite, priceite, paternoite, hydroboracite, kaliborite, and other similar borates. For example, of the various slightly water-soluble borate compounds that can be used, colemanite, calcined colemanite, and ulexite are good examples. An example of a suitable commercially available borate-based crosslinker is "BC-140™," a crosslinker available from Halliburton Energy Services, Inc. of Duncan, Okla. An example of a suitable commercially available zirconium-based crosslinker is "CL-24™," a crosslinker available from Halliburton Energy Services, Inc. of Duncan, Okla. An example of a suitable commercially available titanium-based crosslinking agent is "CL-39™," crosslinking agent available from Halliburton Energy Services, Inc. of Duncan, Okla.

For example, the cross-linker can be added to the proppant slurry in an amount sufficient to provide, inter alia, the desired degree of crosslinking between the cross-linkable gelling agent molecules. For example, the cross-linker can be added to the proppant slurry in an amount in the range from about 0.001% to about 10% by weight, based on the weight of the water in the fracturing fluid. For example, the cross-linker can be added to the proppant slurry in an amount in the range from about 0.01% to about 1% by weight, based on the weight of the water in the fracturing fluid.

The gel breaker can be any gel breaker known to those skilled in the art to break a cross-linked gel formed in fracturing fluids and thereby decrease the viscosity of the fluids in the formation. Any suitable gel breaker can be used, including encapsulated gel breakers and internal delayed gel breakers, such as enzyme, oxidizing, acid buffer, or temperature-activated gel breakers. The gel breakers cause the viscous aqueous base carrier fluid of the proppant slurry to revert to a lower viscosity fluid that can be produced back to the surface after the proppant slurry has been used to place the particulates in the fractures.

For example, the gel breaker can be added to the proppant slurry in an amount in the range of from about 0.5% to about 10% by weight, based on the weight of the cross-linkable gelling agent. The gel breaker breaks the cross-linked gel into a linear gel or a water-like fluid.

The cross-linked gel formed in the proppant slurry is allowed to break down thereby decreasing the viscosity of the proppant slurry in the formation by allowing sufficient time for the gel breaker in the proppant slurry to break the gel and the gel to be broken down. The well can be flowed back to remove broken gel in the proppant slurry from the formation by any manner understood by those skilled in the art with the benefit of this disclosure. For example, the initial stage of production can be carried out in increasing step rates.

For example, the fracturing fluid use in the method disclosed herein (in both the pad fluid stages and the proppant slurry stages) can be foamed or include a wet gas. Foamed fluids and fluids that include wet gases may minimize the exposure of the subterranean formation to the aqueous base carrier fluid, which for some tight formations (including shale formations) advantageously minimizes the deleterious effects that water can have on the formation faces (for example, clay swelling). Foamed fluids and fluids that include wet gases may also, in some embodiments, be capable of helping to suspend the micro-proppant particulates in the base aqueous fluid.

Examples of gases suitable for use in conjunction with the pad fracturing fluid and proppant slurry include, but are not limited to, nitrogen, carbon dioxide, air, methane, helium, argon, and any combination thereof. One skilled in the art, with the benefit of this disclosure, will understand the benefit of each gas. For example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 pounds of proppant per gallon of fracturing fluid if necessary.

The foamed fluid can have a foam quality in the range from any lower limit to any upper limit and encompass any subset therebetween. For example, the quality of the foamed fluid can range from a lower limit of about 5%, 10%, 25%, 40%, 50%, 60%, or 70% gas volume to an upper limit of about 95%, 90%, 80%, 75%, 60%, or 50% gas volume. For example, the foamed treatment fluid may have a foam quality from about 85% to about 95%, or about 92% to about 95%.

Examples of suitable foaming agents that can be used in conjunction with the pad fracturing fluid and proppant slurry include, but are not limited to, cationic foaming agents, anionic foaming agents, amphiphobic foaming agents, non-ionic foaming agents, or any combination thereof. Examples of suitable foaming agents can include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, derivatives of such compounds and any combination thereof. For example, the foaming agent can be included in the foamed fluid at a concentration in the range of from about 0.05 to about 2 percent by volume based on the volume of the liquid component in the fluid (for example, from about 0.5 to about 20 gallons foaming agent per 1000 gallons of liquid).

Additional additives that can be included in the fracturing fluid (as used in both the pad fluid stages and the proppant slurry stages) in the disclosed method include, but are not limited to, hydrocarbon fluids, air, salts, weighting agents, inert solids, fluid loss control agents, emulsifiers, dispersion aids, corrosion inhibitors, emulsion thinners, emulsion thickeners, viscosifying agents, surfactants, lost circulation materials, pH control additives, breakers, biocides, stabilizers, chelating agents, scale inhibitors, mutual solvents, oxidizers, reducers, clay stabilizing agents, and any combination thereof. For example, it may be advantageous to include a clay stabilizing agent in the pad fracturing fluid and/or proppant slurry in order to minimize clay swelling.

For example, all or part of the wellbore penetrating the subterranean formation may include casing pipes or strings placed in the wellbore (a "cased hole" or a "partially cased hole"), in order to, among other purposes, facilitate production of fluids out of the formation and through the wellbore to the surface. For example, the wellbore may also be an "open hole" that has no casing.

Examples of Disclosed Method

For example, the method disclosed herein can be a method of fracturing a low permeability formation, comprising:
 providing a fracturing fluid, the fracturing fluid including a base carrier fluid;
 pumping the fracturing fluid into the formation at a pressure above the fracture gradient of the formation to form a fracture network in the formation, the fracture network including at least one primary fracture and at least one microfracture;
 pre-mixing a plurality of nanoparticles and a plurality of micro-proppant particulates together to form a nanoparticle/micro-proppant particulate mixture;
 mixing the nanoparticle/micro-proppant particulate mixture with the fracturing fluid and placing nanoparticles and micro-proppant particulates in the microfracture;
 mixing a plurality of primary proppant particulates with the fracturing fluid and placing primary proppant particulates in the primary fracture; and
 ceasing pumping of the fracturing fluid into the formation.

For example, the method disclosed herein can be a method of fracturing a low permeability formation, comprising:
 providing a fracturing fluid, the fracturing fluid including an aqueous-based base carrier fluid;
 pumping the fracturing fluid into the formation at a pressure above the fracture gradient of the formation to form a fracture network in the formation, the fracture network including at least one primary fracture and at least one microfracture;
 mixing a plurality of nanoparticles with the fracturing fluid and placing nanoparticles in the microfracture, wherein the nanoparticles are mixed with the fracturing fluid in an amount sufficient to penetrate the microfracture and form a permeable membrane on at least a portion of the face of the microfracture;
 mixing a plurality of micro-proppant particulates with the fracturing fluid and placing micro-proppant particulates in the microfracture;
 mixing a plurality of primary proppant particulates with the fracturing fluid and placing primary proppant particulates in the primary fracture; and
 ceasing pumping of the fracturing fluid into the formation.

For example, the disclosed method can be a method of fracturing a low permeability formation, comprising:
 providing a fracturing fluid, the fracturing fluid including a base carrier fluid;
 pumping the fracturing fluid into the formation at a pressure above the fracture gradient of the formation to form a fracture network in the formation that includes at least one primary fracture and at least one microfracture;
 mixing a plurality of amphiphobic nanoparticles with the fracturing fluid and placing amphiphobic nanoparticles in said microfracture, wherein the amphiphobic nanoparticles are mixed with the fracturing fluid in an amount sufficient to form a permeable membrane on at least a portion of the face of said microfracture;
 mixing a plurality of micro-proppant particulates with the fracturing fluid and placing micro-proppant particulates in the microfracture;
 mixing a plurality of primary proppant particulates with the fracturing fluid and placing primary proppant particulates in the primary fracture; and
 ceasing pumping of the fracturing fluid into the subterranean formation.

For example, the disclosed method can be a method of fracturing a low permeability formation, comprising:
 providing a fracturing fluid, the fracturing fluid including an aqueous-based base carrier fluid;
 pumping the fracturing fluid into the formation at a pressure above the fracture gradient of the formation to form a fracture network in the formation that includes at least one primary fracture and at least one microfracture, wherein the fracturing fluid is pumped into the formation in at least one stage as a pad fluid and in multiple stages as a proppant slurry;
 mixing a plurality of amphiphobic nanoparticles with the fracturing fluid and placing amphiphobic nanoparticles in the microfracture in a pad fluid stage, wherein the amphiphobic nanoparticles are mixed with the fracturing fluid in an amount sufficient to form a permeable membrane on at least a portion of the face of the microfracture;

mixing a plurality of micro-proppant particulates with the fracturing fluid and placing micro-proppant particulates in the microfracture in a pad fluid stage;

mixing a plurality of primary proppant particulates with the fracturing fluid and placing primary proppant particulates in the primary fracture, wherein the primary proppant is mixed with the fracturing fluid in multiple proppant slurry stages, and wherein the size of the primary proppant particulate is gradually increased in each proppant slurry stage; and ceasing pumping of the fracturing fluid into the subterranean formation.

For example, the disclosed method can be a method of fracturing a low permeability formation, comprising:

providing a fracturing fluid, the fracturing fluid including a base carrier fluid;

pumping the fracturing fluid into the subterranean formation at a pressure above the fracture gradient of the formation to form a fracture in the formation;

mixing a plurality of mesoporous silica nanoparticles with the fracturing fluid and placing mesoporous silica nanoparticles in the fracture, the mesoporous silica nanoparticles containing at least one chemical additive that can be released into the fracture and onto the face of the fracture when the mesoporous silica nanoparticles are placed in the fracture;

mixing a plurality of primary proppant particulates with the fracturing fluid and placing primary proppant particulates in the fracture; and ceasing pumping of the fracturing fluid into the formation.

For example, the disclosed method can be a method of fracturing a low permeability formation, comprising:

providing a fracturing fluid, the fracturing fluid including a base carrier fluid;

pumping the fracturing fluid into the subterranean formation at a pressure above the fracture gradient of the formation to form a fracture network in the formation, the fracture network including at least one primary fracture and at least one microfracture;

mixing a plurality of mesoporous silica nanoparticles with the fracturing fluid and placing mesoporous silica nanoparticles in the microfracture, the mesoporous silica nanoparticles containing at least one chemical additive that can be released into the fracture and onto the face of the fracture when the nanoparticles are placed in the fracture, the mesoporous silica nanoparticles being at least partially coated with a temporary sealing agent;

mixing a plurality of micro-proppant particulates with the fracturing fluid and placing micro-proppant particulates in the microfracture;

mixing a plurality of primary proppant particulates with the fracturing fluid and placing primary proppant particulates in the primary fracture; and ceasing pumping of the fracturing fluid into the formation.

For example, the disclosed method can be a method of fracturing a low permeability formation, comprising:

providing a fracturing fluid, the fracturing fluid including a base carrier fluid;

pumping the fracturing fluid into the subterranean formation at a pressure above the fracture gradient of the formation to form a fracture in the formation;

mixing a plurality of proppant particulates with the fracturing fluid and placing primary proppant particulates in the fracture, wherein at least some of the proppant particulates mixed with the fracturing fluid and placed in the fracture have mesoporous silica nanoparticles associated therewith, said mesoporous silica nanoparticles containing at least one chemical additive that can be released into the fracture and onto the face of the fracture when the mesoporous silica nanoparticles are placed in the fracture;

ceasing pumping of the fracturing fluid into the formation.

The method discloses herein can be carried out with the types of equipment typically used in carrying out fracturing operations, as will be known to those skilled in the art with the benefit of this disclosure. For example, referring to FIGS. 4 and 5, the equipment utilized can include a fracturing fluid producing apparatus 20 (for example, for producing the pad fracturing fluid and proppant slurry used in the disclosed method), a fluid source 30, a proppant source 40, and a pump and blender system 50. The fracturing fluid producing apparatus 20 can combine one or more components (for example, the nanoparticles and/or micro-proppant particulates) with the base carrier fluid, which is in liquid or substantially liquid form and provided by the fluid source 30, to form the fracturing fluid. The proppant source 40 can include and provide the primary proppant particulates (and the micro-proppant particulates if desired) for combination with the fracturing fluid. One or more additives (e.g., gelling agents, weighting agents, and/or other optional additives as discussed above) can be provided ay an additive source 70 to alter the properties of the fracturing fluid (for example, the pad fluid and/or proppant slurry). The resulting mixture may be pumped down the well 60 by the pump and blender system 50 under a pressure sufficient to create or enhance one or more fractures in the formation.

In accordance with the disclosed method, complex fracture networks, including primary fractures and microfractures, can be effectively propped open to enhance the amount of hydrocarbons that can be produced from the corresponding subterranean formation after the fracturing treatment is complete. For example, forming a membrane on the surfaces of the microfractures prevents the microfractures from completely sealing off or healing, thereby maintaining open channels and conductive pathways when the pressure is released or reduced. The method helps ensure that microfractures and fissure openings thereof (natural microfractures and induced microfractures) that interconnect with the primary fractures remain open.

As compared to the amount of primary proppant particulates added to the fracturing fluid, only a relatively small amount of nanoparticles needs to be added to the fracturing fluid in order for the nanoparticles to be effective. For example, small volumes of nanoparticles can cover large surface areas of low permeability formation fracture faces.

The use of nanoparticles in the fracturing fluid (for example, during the pad fluid stages as the formation is fractured) can significantly restrict fluid flow into the pore throats of shale and other low permeability formation rock to prevent deep invasion of the fracturing fluid into the formation matrix that often causes fracture damage issues due to water-sensitive clays in the formation. For example, the nanoparticles placed in the microfracture protect the faces of the microfractures from water invasion during the fracturing operation. For example, average pore throat sizes in shales can range from 0.005 to 0.03 micrometers. The nanoparticles temporarily block such pore throats thereby controlling or preventing water imbibition by clay minerals and controlling or preventing clay swelling and sloughing. Proppant embedment via modulus enhancement (as a result of fluid invasion) is also resisted.

A durable, textured membrane can be formed by the nanoparticles and micro-proppant particulates (when used) which functions to control fluid loss into the formation and provide a resilient surface on the faces of the microfractures that is capable of maintaining open flow channels even in the presence of swelling and softening clay and formation fines intrusion along the fracture faces. By forming a membrane on the microfracture faces, the nanoparticles provide a template to enhance the deposition of micro-proppant particulates to the fracture faces thereby enhancing vertical and lateral distribution of micro-proppant particulates in microfractures.

Stabilizing the faces of both primary fractures and microfractures can improve fluid flow through the complex fracture networks of low permeability formations and ultimately result in increased production from the formation. For example, such stabilization helps contain fines from escaping with gas migration.

The use of amphiphobic nanoparticles can further enhance the removal of aqueous based fracturing fluids from the formation during the flowback stage of the fracturing treatment. The use of amphiphobic nanoparticles can also enhance the ultimate production of hydrocarbons from the formation. For example, when coated on the fracture faces, amphiphobic nanoparticles can help increase the relative permeability of the formation.

Silica nanoparticles are relatively inexpensive and commercially available. Surface treating the nanoparticles can modify the surface phobicity of both primary fractures and microfractures to enhance recovery of the fracturing fluid from the fracture network.

The use of mesoporous silica nanoparticles allows chemical additives to be directly placed deep inside the generated microfractures. The use of the temporary sealing agent allows the chemical additives to be slowly released over time. As shown by FIG. 3, an enlarged footprint can be created around the nanoparticles thereby helping to create a more complete membrane covering the exposed surfaces. The mechanical properties at the fracture face can be altered.

Figure 4:
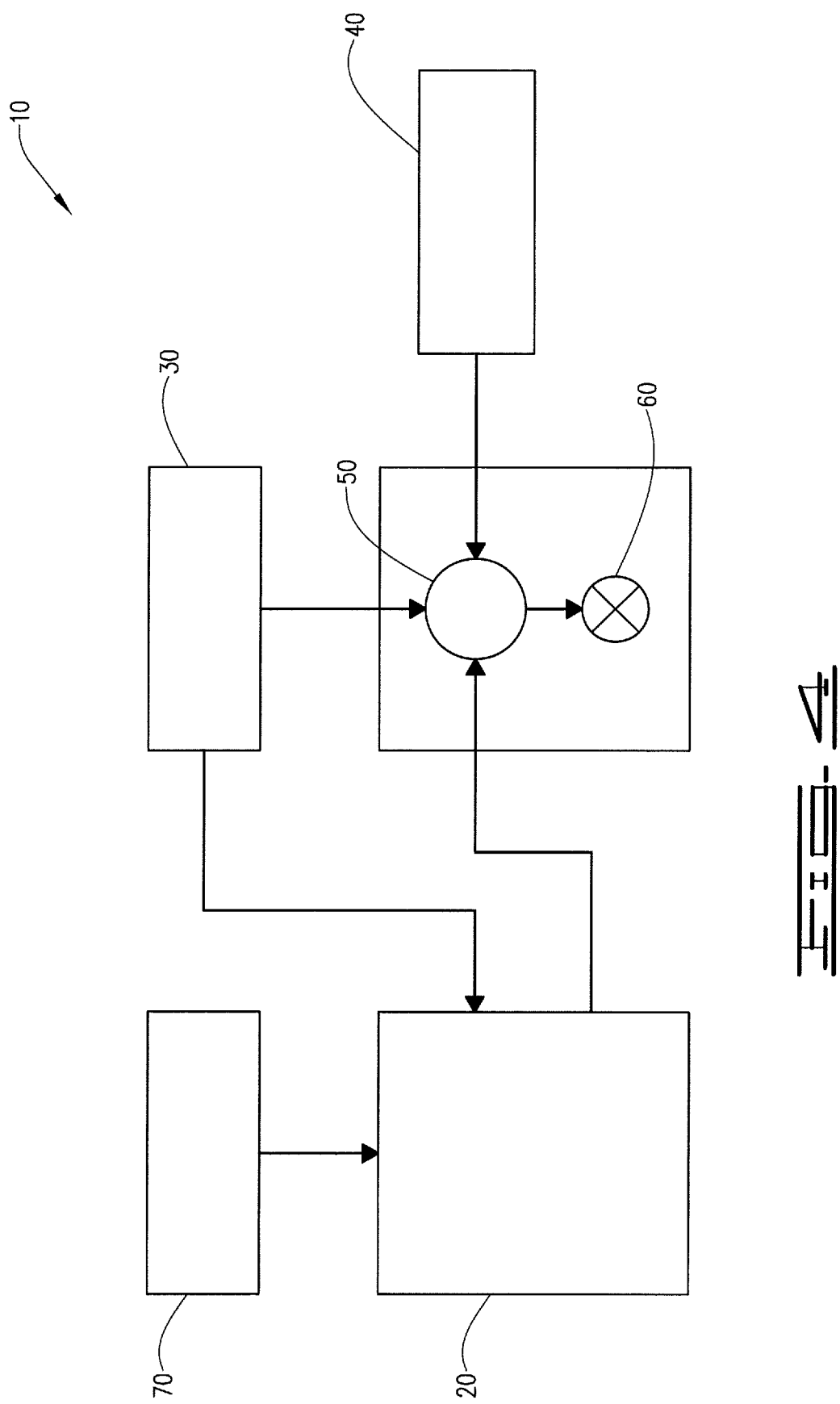
FIG. 4 is a diagram illustrating an example of a fracturing system that can be used in accordance with certain embodiments of the present disclosure.
Figure 5:
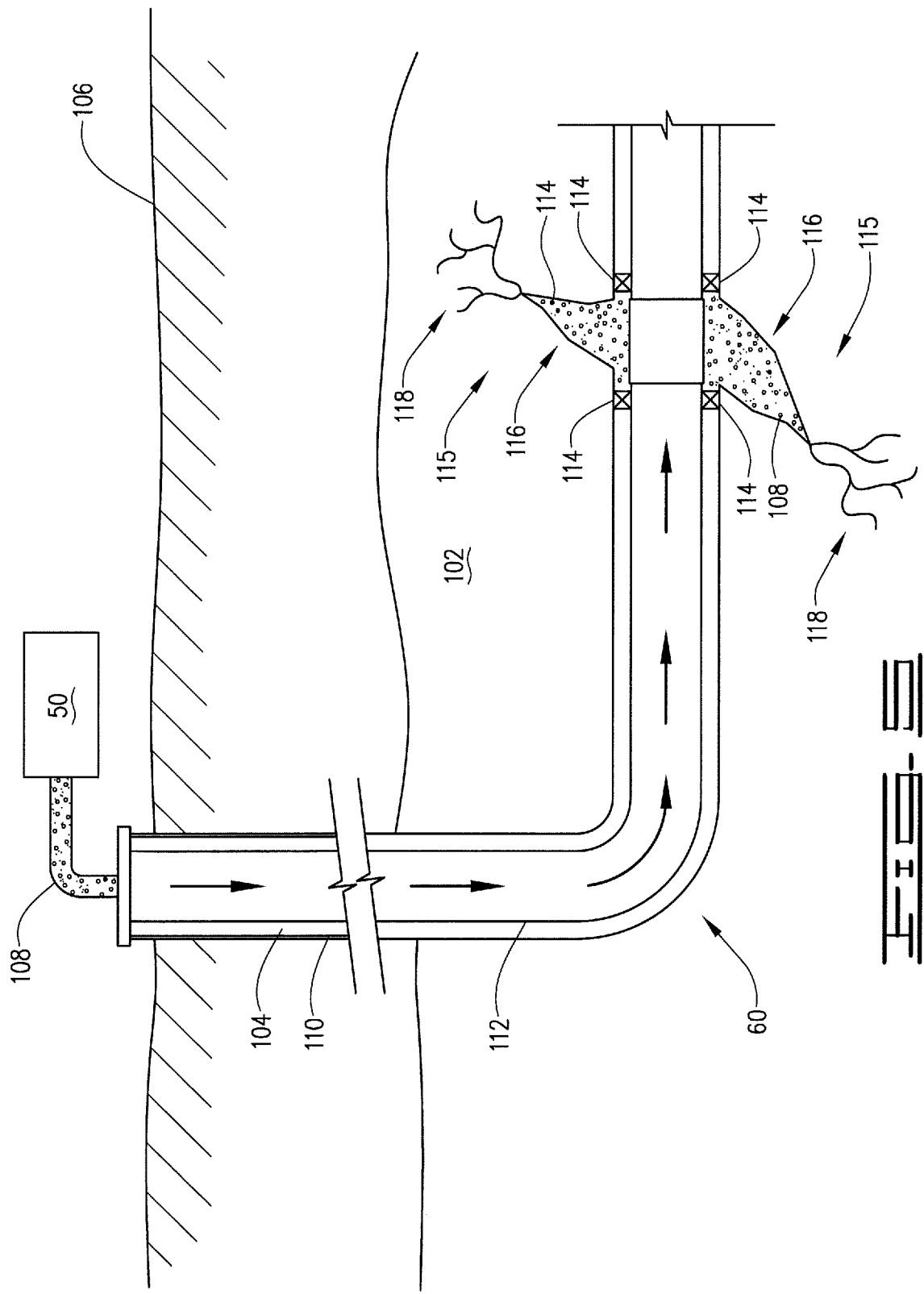
FIG. 5 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 4 and 5 illustrate a typical fracturing operation that can be used in association with the disclosed method.

For example, and with reference to FIG. 4, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing the pad fracturing fluid and proppant slurry used in the disclosed method), a fluid source 30, a proppant source 40, and a pump and blender system 50. The system 10 resides at the surface at a well site where a well 60 is located. For example, the fracturing fluid producing apparatus 20 can combine a gel precursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that provides one or more additives (e.g., gelling agents, weighting agents, and/or other optional additives as discussed above) to alter the properties of the fracturing fluid (for example, the pad fluid and/or proppant slurry). For example, additives from the additive source 70 can be included to reduce pumping friction, to reduce or eliminate the fluid's reaction to the geological formation in which the well is formed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid from additives from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particulates, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on the fly" methods. Thus, for example, the pump and blender system 50 can provide just fracturing fluid (for example, the pad fluid) into the well at some times, just proppant slurry at some times, just proppant particulates at other times, and combinations of those components at yet other times.

FIG. 5 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Access conduits (for example, perforations) can be formed in the casing 110 to allow fracturing fluids and/or other materials to flow into the subterranean formation 102. In cased wells, perforations can be formed using shaped charges, a perforating gun, hydro jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 5 shows two packers 114, one defining an uphole boundary of the interval and one defining the downhole end of the interval.

When the fracturing fluid 108 (for example, the pad fracturing fluid) is introduced into wellbore 104 (e.g., in FIG. 4, the area of the wellbore 104 between packers 114) at a sufficient hydraulic pressure, a fracture network 115 including one or more primary fractures 116 and microfractures 118 are created in the subterranean zone 102. As shown, the microfractures 118 have propagated from or near the ends and edges of the primary fractures 116. The primary proppant particulates in the fracturing fluid 108 (for example, the proppant slurry) enter the fractures 116 where they may remain after the fracturing fluid flows out of the wellbore, as described above. These primary proppant particulates prop fractures 116 open such that fluids may flow more freely through the fractures 116 to the wellbore 104. The nanoparticles and the micro-proppant particulates in the fracturing fluid 108 enter the microfractures 118 where they may remain after the fracturing fluid flows out of the wellbore, as described above. For example, the micro-proppant particulates or a membrane formed by the nano-particles and micro-proppant particulates prop microfractures 118 open such that fluids may flow more freely through the microfractures 118 into the primary fractures 116.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubular conduits, and/or pipes used to fluidly move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of fracturing a subterranean formation, comprising:
   providing a fracturing fluid, said fracturing fluid including a carrier fluid;
   pumping said fracturing fluid into the formation at a pressure above a fracture gradient of the formation to form a fracture network in the formation, said fracture network including a primary fracture and a microfracture;
   mixing a plurality of nanoparticles with said fracturing fluid and placing said nanoparticles in said primary fracture, wherein said placing includes placing said nanoparticles in said microfracture; wherein said nanoparticles are mixed with said fracturing fluid in an amount sufficient to penetrate said microfracture and form a permeable membrane on at least a portion of a face of said microfracture; and wherein at least a portion of said nanoparticles have been treated with at least one chemical additive;
   releasing said at least one chemical additive, upon said placing said nanoparticles in said microfracture, onto said face of the microfracture to treat said face of said microfracture, and wherein said at least one chemical additive modifies surface phobicity of, modifies surface wettability of, or stabilizes said face of said microfracture;
   mixing a plurality of primary proppant particulates with said fracturing fluid and placing said primary proppant particulates in said primary fracture; and
   ceasing the pumping of said fracturing fluid into the formation.

2. The method of claim 1, wherein said carrier fluid of said fracturing fluid is an aqueous-based carrier fluid.

3. The method of claim 1, wherein the D50 particle size distribution of said primary proppant particulates is increased as said primary proppant particulates are mixed with said fracturing fluid.

4. The method of claim 1, wherein the sizes of said nanoparticles vary so as to allow the permeable membrane to be formed on at least a portion of said face of said microfracture.

5. The method of claim 1, wherein the method further comprises:
   prior to ceasing the pumping of said fracturing fluid into the formation, mixing a plurality of micro-proppant particulates with said fracturing fluid and placing the micro-proppant particulates in said microfracture.

6. The method of claim 5, wherein said plurality of nanoparticles are mixed with said fracturing fluid, and said nanoparticles are placed in said microfracture, and said plurality of micro-proppant particulates are mixed with said fracturing fluid, and said micro-proppant particulates are placed in said microfracture, before mixing said plurality of primary proppant particulates with said fracturing fluid and placing said primary proppant particulates in said primary fracture.

7. The method of claim 1, wherein said nanoparticles include amphiphobic nanoparticles.

8. The method of claim 1, wherein said at least a portion of said nanoparticles that have been treated include mesoporous silica nanoparticles that have been treated with said at least one chemical additive by impregnating pores of the mesoporous silica nanoparticles with the at least one chemical additive.

9. The method of claim 1, wherein said nanoparticles have been at least partially coated with a temporary sealing agent.

10. A method of fracturing a low permeability formation, comprising:
    providing a fracturing fluid, said fracturing fluid including a carrier fluid;
    pumping said fracturing fluid into the formation at a pressure above a fracture gradient of the formation to form a fracture network in the formation that includes a primary fracture and a microfracture;
    mixing a plurality of amphiphobic nanoparticles with said fracturing fluid and placing said amphiphobic nanoparticles in said microfracture, wherein said amphiphobic nanoparticles are mixed with said fracturing fluid in an amount sufficient to form a permeable membrane on at least a portion of a face of the microfracture, and wherein at least a portion of said amphiphobic nanoparticles have been treated with at least one chemical additive;
    releasing said at least one chemical additive, upon said placing said amphiphobic nanoparticles in said microfracture, onto said face of the microfracture to treat said face of said microfracture, and wherein said at least one chemical additive modifies surface phobicity of, modifies surface wettability of, or stabilizes said face of said microfracture;
    mixing a plurality of micro-proppant particulates with said fracturing fluid and placing said micro-proppant particulates in said microfracture;
    mixing a plurality of primary proppant particulates with said fracturing fluid and placing said primary proppant particulates in said primary fracture, wherein the D50 particle size distribution of said primary proppant particulates is increased as said primary proppant particulates are mixed with said fracturing fluid; and
    ceasing the pumping of said fracturing fluid into the formation.

11. The method of claim 10, wherein said carrier fluid of said fracturing fluid is an aqueous-based carrier fluid.

12. The method of claim 10, wherein said primary proppant particulates comprise sand.

13. A method of fracturing a low permeability formation, comprising:
    providing a fracturing fluid, said fracturing fluid including a carrier fluid;
    pumping said fracturing fluid into the subterranean formation at a pressure above a fracture gradient of the formation to form a fracture network in the formation, said fracture network including a primary fracture and a microfracture;
    mixing a plurality of mesoporous silica nanoparticles with said fracturing fluid and placing said mesoporous silica nanoparticles in said microfracture, said mesoporous silica nanoparticles containing at least one chemical additive; wherein said mesoporous silica nanoparticles are mixed with said fracturing fluid in an amount sufficient to form a permeable membrane on at least a portion of a face of the microfracture;
    releasing said at least one chemical additive, upon said placing said mesoporous silica nanoparticles in said microfracture, onto said face of said microfracture, and wherein said at least one chemical additive modifies surface phobicity of, modifies surface wettability of, or stabilizes said face of said microfracture;
    mixing a plurality of primary proppant particulates with said fracturing fluid and placing said primary proppant particulates in said primary fracture; and
    ceasing the pumping of said fracturing fluid into the formation.

14. The method of claim 13, wherein said carrier fluid of said fracturing fluid is an aqueous-based carrier fluid.

15. The method of claim 13, further comprising: mixing a plurality of micro-proppant particulates with said fracturing fluid and placing said micro-proppant particulates in said microfracture.

16. The method of claim 13, wherein said fracturing fluid is pumped into the subterranean formation using a pump and blender system.

17. The method of claim 13, wherein the D50 particle size distribution of said primary proppant particulates is increased as said primary proppant particulates are mixed with said fracturing fluid.

* * * * *